Feb. 20, 1945.  O. B. VETTER  2,370,095
MULTIPLE RING BALANCE
Filed July 2, 1942  2 Sheets-Sheet 1

Inventor
Otto B. Vetter,
By Albert I. Kegan
Attorney

Feb. 20, 1945.  O. B. VETTER  2,370,095
MULTIPLE RING BALANCE
Filed July 2, 1942  2 Sheets-Sheet 2
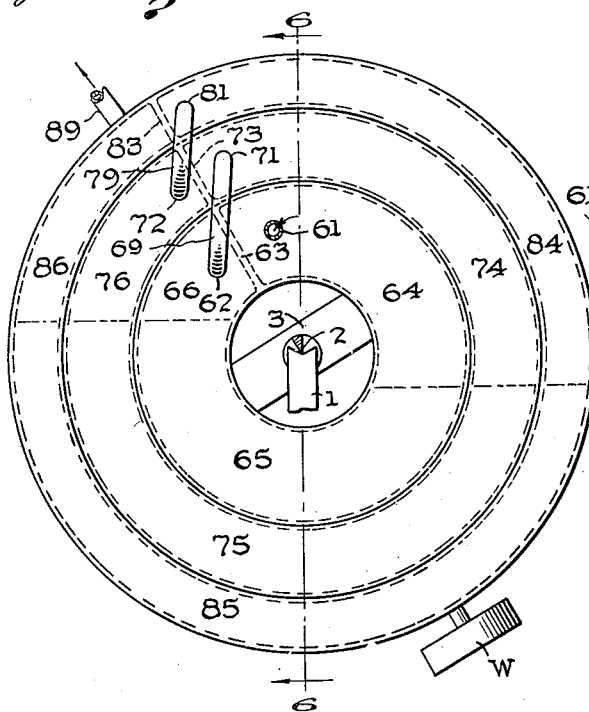
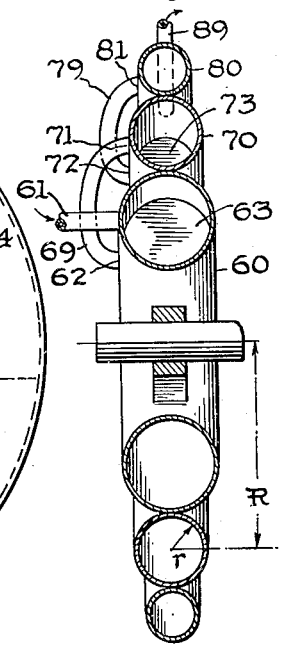
Inventor
Otto B. Vetter
By Albert I. Kegan
Attorney Patented Feb. 20, 1945

2,370,095

UNITED STATES PATENT OFFICE 2,370,095

MULTIPLE RING BALANCE

Otto B. Vetter, Chicago, Ill., assignor to Ring Balance Instrument Company, Chicago, Ill., a corporation of Illinois Application July 2, 1942, Serial No. 449,483

12 Claims. (Cl. 73—405)

The present invention relates to ring-balance flow meters and more particularly to multiple ring assemblies each embodying a plurality of connected rings operating as a single unitary ring-balance.

The present invention has for its primary object the extension of the operating principle of ring-balance flow meters in order to extend the range of operation thereof and to permit the same to be housed in casings of ordinary size while attaining higher ranges of operation than those normally attainable with ring-balances of the prior art. The ring-balance formed of a single ring and the operating principle thereof is well known. A hollow ring-body is mounted rotatably on knife edges so that it can rotate about its axis of symmetry. The ring-body is approximately half-filled with a sealing liquid. A partition is inserted across the ring-body in the space above this liquid and divides it into two distinct compartments. One compartment is connected to the high pressure tap and the other to the low pressure tap of the primary element such as an orifice, flow nozzle, venturi, or the like. The connections of the ring-body to the differential pressure pipes are made with flexible tubes which exercise no restraining influence upon its motion.

The torque created by the differential pressure acting upon the partition causes the ring-body to rotate. By rigidly attaching an external counterweight (W) to the ring-body, a torque opposing its rotation is brought into play. The assembly then becomes a symmetrical ring-balance and rotates only until the torque due to the differential pressure is balanced by the torque exerted by the counterweight.

The angle of rotation of the ring-balance from its zero position is a direct measure of the pressure differential applied thereto. By means of a suitable linkage and cam, the angular movement of the ring-balance is converted into readings of the rate of flow on an appropriate scale and in any desired units.

Such ring balances are built for pressures up to 5000 pounds per square inch. Low pressure meters are adapted to give full scale readings with pressure differentials ranging from one inch of water to eight inches of water, while high pressure meters are adapted to give full scale readings with pressure differentials ranging from twenty inches of water to one hundred sixty inches of water. The low pressure meters are usually sealed with oil and the high pressure meters with mercury.

An example of a ring balance as described above is shown generally in my co-pending application entitled "Ring balance," Serial No. 413,777, filed October 6, 1941, which matured into Patent 2,333,834, granted November 9, 1943.

The present invention seeks to improve the basic ring-balance assembly shown generally in that patent by providing an assembly of a plurality of rings filled with sealing fluid which is subjected to differential pressure conditions and which rings react cumulatively to indicate the differential pressure condition. The use of multiple rings makes possible the application of such to high differential meters. Furthermore, the same differential pressures may be indicated with the use of sealing liquids less dense than mercury, which is particularly advantageous in view of the present scarcity of this metal. These objects are attained without enlarging the instrument housing, but merely by utilizing the space therein which presently serves no useful function.

The invention may be realized in one way by the assembly and interconnection of two or more rings, with the initial and final ones connected respectively to the high pressure tap and the low pressure tap of the fluid flow which is undergoing metering, with the sealing medium in the initial ring which is subjected to the high pressure tap, communicating the pressure imposed thereupon to the sealing medium in the successive rings to the final one through the intermediary of a liquid of lesser density than the main sealing medium, said liquid being superposed upon the sealing medium and being free to move between adjacent rings. The outlet from the first sealing ring with the lighter liquid therein is connected to the inlet of the successive ring with the lighter liquid therein to transmit the pressure existing at the high pressure tap through the successive bodies of incompressible fluids consisting alternately of the sealing medium and the pressure transmitting liquid to the outlet space of the final ring which communicates with the low pressure tap, and the torque exerted by the differential pressure as evidenced by the increments of the differences in level of the heavy sealing medium is balanced by the torque exerted by the counterweight, which is characteristic of the operation of the single ring balance.

In view of the fact that the torque exerted by the unbalanced levels of the sealing fluids is proportional to the areas of the rings, the capacity of the ring balance can be modified at will by the modification of the number of the multiple rings communicating with each other. Furthermore, the disposition of these rings can be varied so that the same may be either of the same radial dimensions and laterally juxtaposed to each other, or these rings may be disposed concentrically one inside another in a common vertical plane.

It is a principal object of the present invention to provide a ring balance device which is responsive to differential pressures greater than the differential pressure of the unbalanced sealing medium in any single tubular ring of the multiple ring balance assembly.

A further object is to provide a ring balance measuring device of compact proportions responsive to large differential pressures.

Another object is to provide a ring balance assembly of conventional external dimensions and utilizing a sealing liquid less dense than mercury but which nevertheless operates accurately under differential pressures as great as those which may be registered in a ring balance of equal external diameter and filled with mercury.

Another object is to provide a ring balance capable of operating in a plurality of ranges of differential pressure, the device being adapted to operation in each successive increasing range of differential pressure by the simple expedient of attaching another ring body thereto and making the appropriate series connection between the newly added ring and the next preceding ring in the assembly, or in some cases by tapping off the outlet connection from different rings of the assembly.

Furthermore, it is an object of the present invention to provide a multiple ring balance having all the advantages characteristic of a single ring balance and one which is compact, rugged and economical.

Other objects and purposes will appear from the detailed description of the invention following hereinafter, taken in conjunction with the accompanying drawings, wherein, Fig. 1 is a top plan view of a multiple ring balance in accordance with the present invention;

Fig. 5 illustrates a different embodiment of the invention in which the ring-like bodies are embraced one within the other in a common vertical plane; and Fig. 6 is a vertical sectional view along line 6—6 of Fig. 5.

Figure 1:
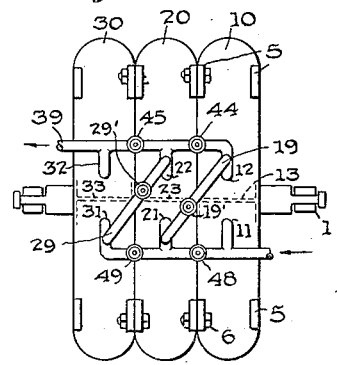
Figure 2:
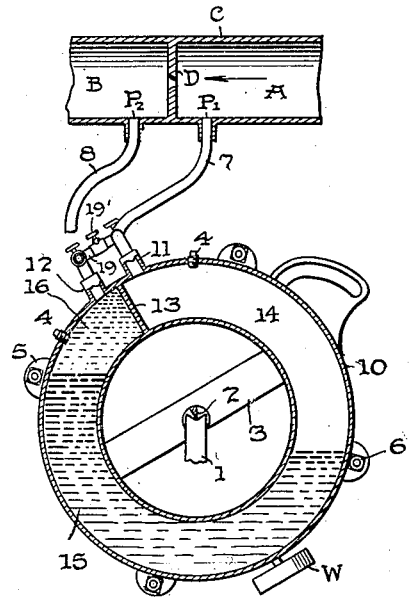
Fig. 2 is a vertical sectional view of the initial ring showing the association of the assembly with the flow conduit in which the pressure conditions are undergoing metering.

As shown in Figs. 1 and 2, a ring balance of increased capacity may be attained by the juxtaposition of three individual ring-balances 10, 20 and 30 by the convenient provision of lugs 5 at peripherally spaced points upon the outside walls thereof which may be bolted together by means of bolt and nut assemblies 6. The ring-balances are connected to each other so that the partitions 13, 23 and 33 are in alignment with each other. For convenience in illustration, three of such ring-balances are illustrated in these figures and any other form of connecting means may be utilized. Two of such rings may be used and the number may be multiplied to extend the range of operation of the instrument to any desired degree. A knife edge bearing, provided by the support 1 on the frame upon which rests the knife edge 2 of the ring frame assembly which includes the crosspiece 3, serves to support the device without friction for movement in response to variable conditions in the flow conduit C through which the fluid undergoing metering passes in the direction of the arrow shown in Fig. 2. A high pressure tap $P_1$ is provided in the high pressure chamber A and a low pressure tap $P_2$ is provided in the low pressure chamber B. Said chambers are separated by the orifice plate D. A flexible connection 7 connects the high pressure tap $P_1$ with the inlet 11 to the first ring 10 of the assembly, while a flexible connection 8 connects the low pressure tap $P_2$ with the outlet end 32 of the terminal ring 30. These flexible connections offer substantially no impediment to the movement of the ring-balance. The ring bodies 10, 20 and 30 are provided with partitions 13, 23 and 33, respectively. These partitions may be in alignment with each other, or if desired, they may be staggered near the tops of the rings, for example by 10° displacements.

Filling plugs 4 are disposed in each of these rings for receiving the sealing and pressure transmitting fluids. Mercury heretofore customarily has been employed as the sealing fluid in high differential meters, but the growing scarcity and increasing cost of this metal renders desirable a ring-balance construction which will operate under high differentials while employing some other liquid. I have found that acetylene tetrabromide $(CHBr_2)_2$ constitutes an effective sealing liquid for use in my new multiple ring balance. This substance is a yellow liquid having a specific gravity of nearly 3. It is insoluble in water, and therefore water may be used as the incompressible pressure transmitting medium in conjunction with acetylene tetrabromide used as the sealing medium. These two liquids also satisfy the desideratum of having a small interfacial surface tension.

Figure 3:
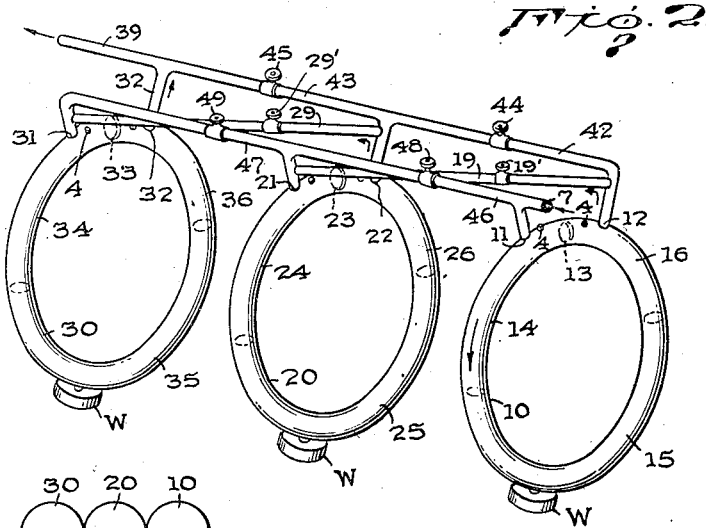
Fig. 3 is a perspective view of the arrangement shown in Fig. 1 with the connections extended for the purpose of clarity in illustration.

In Figs. 2 and 3 is shown the effect of high pressure in chamber A acting through the chamber 14 of ring 10 on one face of partition 13 relative to the low pressure acting against the partition 33 communicating with chamber B in the low pressure side of the flow conduit. This causes the level of the sealing medium 15, 25 and 35 to be altered, thereby producing a torque, which in turn is balanced by the counterweights W on the ring balance assembly. The unbalance of the sealing medium 15 is communicated to the successive masses of sealing liquid 25 and 35 through pressure transmitting masses 16 and 26 in rings 10 and 20 respectively, which communicate with corresponding masses 24 and 34 in rings 20 and 30 respectively, and thus ultimately transmit the unbalance to the sealing fluid 35 in the final or terminal ring 30. The chamber 36 in the ring 30 communicates through the outlet 32 with the flexible conduit 8 connected with the low pressure tap $P_2$.

The cumulative effect of the unbalance in each of the ring bodies may be summed up in different ways and in the arrangement shown in Figs. 1 to 3, valves have been provided to render the action of the ring balances cumulative in series or in parallel. Since the torque exerted is proportional to the areas of the rings, the serial connection of the multiple rings produces an effect which would be the equivalent of a ring-balance having a ring of the same cross-sectional area as the individual rings but of enlarged diameter whereas the connection of the multiple rings in parallel is equivalent in effect to a ring assembly of the same diameter but wherein the cross-sectional area of the ring is enlarged. In the latter case, operation with only a sealing liquid is necessary since no need arises for the successive transmission of the unbalance through the plurality of rings. With the structural arrangement shown in Fig. 3 both alternative modes of operation are possible. Thus, assuming the valves 44, 45, 48 and 49 in the arrangement shown in Figs. 1 and 3 closed, the bridging conduit 19 effective to connect the outlet chamber 16 of the ring 10 with the inlet chamber 24 of the ring 20, and the bridging conduit 29 effective to connect the outlet chamber 26 of ring 20 with the inlet chamber 34 of ring 30, it is readily seen that the pressure in chamber 12 leading from the high pressure tap $P_1$ is communicated successively through the heavy liquid mass 15, the light liquid mass 16, outlet 12 of ring 10, conduit 19, inlet 21 of ring 20, light liquid mass 24, heavy liquid mass 25, light liquid mass 26, outlet 22 of ring 20, conduit 29, inlet 31 of ring 30, light liquid mass 34, heavy liquid mass 35, to low pressure chamber 36 and outlet 32 communicating with conduit 39 which is connected to flexible connection 8 communicating with low pressure tap $P_2$ in the flow conduit C.

The alternative mode of operation in which the rings are operated in parallel may be realized by opening valves 48 and 49 in conduits 46 and 47 which connect each one of the inlets 11, 21 and 31 in the respective rings 10, 20 and 30 with the high pressure tube 7. Also valves 44 and 45 in conduits 42 and 43 are opened and valves 19' and 29' in conduits 19 and 29 are closed. Thereby the pressure in chamber A is imposed upon the sealing liquid 15, 25 and 35 in each of rings 10, 20 and 30, respectively. In this mode of operation only the heavy sealing fluid 15, 25 and 35 is utilized in gas measurement and the superposed masses of pressure transmitting liquid are necessary; the same may be poured off from the rings if conversion is made from one mode of operation to another. The outlet chambers 16, 26 and 36 of each of rings 10, 20 and 30 are connected by the conduits 42 and 43 and the open valves 44 and 45 therein to connect the free pressure spaces 16, 26 and 36 in the respective rings 10, 20 and 30 with the low pressure chamber B in the flow conduit C.

Figure 4:
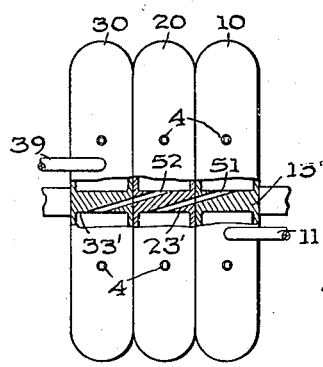
Fig. 4 is a plan view with certain parts in section of a modified construction of a multiple ring balance.

In the construction shown in Fig. 4, no exterior conduit connections are shown between the rings 10, 20 and 30. In this construction the partitions 13', 23' and 33' are bored with passages 51 and 52 so that the outlet passage of ring 10 communicates with the inlet passage of ring 20 and the outlet passage of ring 20 communicates with the inlet passage of ring 30. The inlet 11 in ring 10 and the outlet 39 of ring 30 are similar to the corresponding elements in the arrangement shown in Figs. 1 to 3, provided with external connections. This construction permits only a series operation of the rings and necessitates the filling of the rings with predetermined amounts of heavy and light liquids through suitable filling plugs 4.

In the arrangement shown in Figs. 5 and 6, the multiple rings are formed of a plurality of tores or rings in which each torus is critically dimensioned with respect to the others so that the displacement of the incompressible fluid from one to the other results in a common displacement of the heavy liquid, as shown in dotted lines. The dimensions of the ring-like bodies 60, 70 and 80 are so proportioned that the volume embraced by each is the same. The volume of a torus, which is defined as the figure generated by revolving a circle about an axis in its plane but not intersecting it, is represented by the formula, $$\text{volume} = 2\pi^2 R r^2$$

wherein $r$ is the radius of the generating circle and $R$ is the distance of the center of the generating circle from the axis of revolution. The variables $R$ and $r$ are designated in Fig. 6 and may be varied to render the volumes of the rings 60, 70 and 80 identical. In the event the volumetric dimensions of the ring-like bodies are not the same, the liquid levels in the rings will be different as a result of the same volumetric displacement in each ring.

The construction shown in Figs. 5 and 6 may be preferable in such cases where the depth of the housing does not permit the axial juxtaposition of sufficient rings arranged side by side to each other.

In the arrangement shown in Figs. 5 and 6, the inlet 61 in the ring 60 from the high pressure tap communicates with chamber 64 which imposes the high pressure upon the sealing medium 65 which in turn forces the fluid pressure transmitting liquid in chamber 66 through the outlet 62 into conduit 69 to the inlet 71 of ring 70 whereat the pressure transmitting medium such as water in chamber 74 exerts its pressure upon the sealing liquid 75, which in turn transmits the unbalanced pressure to the mass of lighter liquid 76 through outlet 72, conduit 79 and inlet 81 of ring 80 to the chamber 84. The water in chamber 84 gives rise to an unbalance of the level of the heavy liquid 85 which exerts its displacement upon the chamber 86 which communicates with the low pressure tap through the outlet 89.

While I have described my invention as embodied in specific form and as operating in a specific manner, for purpose of illustration, it should be understood that I do not limit my invention thereto, since various modifications will suggest themselves to those skilled in the art without departing from the spirit of my invention, the scope of which is set forth in the annexed claims.

Having thus described my invention and illustrated its utility, I claim:

1. A ring-balance comprising a shaft, a plurality of rotatable hollow rings upon said shaft, a partition in the upper portion and a liquid body in the lower portion of each of said rings, liquid of lesser density and immiscible with said liquid bodies filling the space between said liquid bodies, connections between said rings to permit displacement of said liquid of lesser density from any ring to an adjacent ring, a connection between one side of one terminal ring and a source of pressure, and a similar connection between the opposite side of the other terminal ring and another source of pressure.

2. A ring-balance as set forth in claim 1 wherein said liquids are non-metallic.

3. A ring-balance as set forth in claim 1 wherein the liquid in the lower portion of each ring is acetylene tetrabromide, and the liquid immiscible therewith is water.

4. A ring-balance comprising $n$ juxtaposed concentric hollow rings rotatable as a unit about the axis of symmetry thereof; a counterweight therefor; $n$ partitions, one in the upper portion of each of said rings; two inlets, one on one side of the partition in the outermost ring and the other on the opposite side of the partition in the innermost ring; $n-1$ conduits, each connecting two adjacent rings in series; $n$ bodies of sealing liquid, one in the lower portion of each ring; and liquid immiscible with said sealing liquid and filling said conduits and the space in said rings between said bodies of sealing liquid; $n$ being an integer greater than 1.

5. A ring-balance comprising a shaft, a plurality of coaxial hollow rings of equal cross-sectional area axially spaced upon said shaft and connected to rotate as a unit, a counterweight therefor, a partition in each of said hollow rings, a fluid-pressure inlet in one end ring on one side of the partition therein, a fluid pressure inlet in the other end ring on the opposite side of the partition therein, a sealing liquid in the lower portion of each of said rings, liquid of lesser density than said sealing liquid above the latter, and means whereby said liquid of lesser density is connected in series with similar liquid in an adjacent ring.

6. A ring-balance as set forth in claim 5 wherein the connecting means comprises a passageway piercing adjacent partitions and establishing communication from one side of the partition in one ring to the opposite side of the partition in an adjacent ring.

7. A ring-balance as set forth in claim 5 wherein the hollow rings are connected in series and include at least one intermediate ring between the two end rings, said intermediate ring containing a sealing liquid at the bottom thereof and pressure transmitting liquid of lesser density above each side thereof in communication with similar liquid in the rings adjacent thereto.

8. A ring-balance comprising a plurality of radially juxtaposed concentric hollow rings of equal volume rotating as a unit, a counterweight for said unit, a partition in each of said rings, an inlet in the outermost ring on one side of the partition therein, an inlet in the innermost ring on the opposite side of the partition therein, sealing liquid in each of said rings below the level of said inlets, liquid less dense than said sealing liquid filling the space therebetween, and means serially connecting successive bodies of said less dense liquid.

9. A ring-balance as set forth in claim 8 wherein the connecting means comprise external tubular connections from one side of the partition in one ring to the opposite side of the partition in an adjacent ring.

10. A ring-balance as set forth in claim 8 wherein the plurality of rings includes at least one ring intermediate the inner and outer rings, said intermediate ring being completely filled with sealing liquid superposed by less dense liquid immiscible therewith, the superposed liquid on one side of the partition in said intermediate ring communicating through one of said connecting means with one adjacent ring, and the superposed liquid on the other side of said partition communicating through another of said connecting means with the other adjacent ring.

11. A ring-balance comprising a plurality of connected hollow ring-like bodies, a counterweight therefor, a partition in each of said ring-like bodies, an inlet chamber in one ring-like body, a second inlet chamber in another ring-like body, fluid conveying means connecting the interiors of adjacent ring-like bodies in series, and pressure transmitting means completely filling said conveying means and said ring-like bodies between said chambers, said pressure transmitting means comprising at least one mass of liquid superposed upon a plurality of masses of liquid of greater density.

12. A ring-balance as set forth in claim 11 wherein adjacent partitions are perforated to form said fluid conveying means.

OTTO B. VETTER.